US012742441B2

(12) United States Patent
Bunge

(10) Patent No.: US 12,742,441 B2
(45) Date of Patent: Sep. 22, 2026

(54) METHOD FOR DETECTING A BLADE MISALIGNMENT OF A ROTOR BLADE OF A ROTOR OF A WIND TURBINE

(71) Applicant: Wobben Properties GmbH, Aurich (DE)

(72) Inventor: Frank Bunge, Ludwigshafen (DE)

(73) Assignee: Wobben Properties GmbH, Aurich (DE)

( * ) Notice: Subject to any disclaimer, the term of this patent is extended or adjusted under 35 U.S.C. 154(b) by 11 days.

(21) Appl. No.: 18/194,294

(22) Filed: Mar. 31, 2023

(65) Prior Publication Data

US 2023/0314130 A1 Oct. 5, 2023

(30) Foreign Application Priority Data

Apr. 1, 2022 (EP) .................................... 22166371

(51) Int. Cl.

| | |
|---|---|
| ***F03D 17/00*** | (2016.01) |
| *F03D 7/02* | (2006.01) |
| *F03D 7/04* | (2006.01) |

(52) U.S. Cl.

CPC .......... *F03D 17/029* (2023.08); *F03D 7/0224* (2013.01); *F03D 7/044* (2013.01); *F03D 17/00* (2016.05); *F03D 17/006* (2023.08); *F03D 17/0065* (2023.08); *F05B 2260/80* (2013.01); *F05B 2260/821* (2013.01); *F05B 2260/84* (2013.01); *F05B 2270/304* (2013.01); *F05B 2270/326* (2013.01); *F05B 2270/328* (2013.01);

(Continued)

(58) Field of Classification Search

CPC .... F03D 17/029; F03D 7/0224; F03D 7/0204; F03D 17/00; F03D 17/006; F03D 17/0065; F03D 7/044; F05B 2270/328; F05B 2270/329; F05B 2260/821; F05B 2260/80; F05B 2260/83; F05B 2260/84; F05B 2270/304; F05B 2270/326; G01M 1/00

See application file for complete search history.

(56) References Cited

U.S. PATENT DOCUMENTS

| | | | | |
|---|---|---|---|---|
| 11,138,816 B1 * | 10/2021 | Bechhoefer ............ | G07C 5/085 |
| 2010/0301605 A1 * | 12/2010 | Nielsen ................ | F03D 7/0224 290/44 |

(Continued)

FOREIGN PATENT DOCUMENTS

| | | | |
|---|---|---|---|
| DE | 102011112732 A1 * | 3/2013 | F03D 7/0204 |

*Primary Examiner* — Courtney D Heinle
*Assistant Examiner* — Art Golik
(74) *Attorney, Agent, or Firm* — Seed Intellectual Property Law Group LLP

(57) ABSTRACT

Provided is a method for detecting at least one blade misalignment of a rotor blade of a rotor of a wind turbine having multiple rotor blades adjustable in their blade angle. The blade misalignment describes a blade angle deviation of a detected blade angle of the rotor blade from a reference blade angle. The wind turbine includes a gondola having the rotor and an azimuth adjustment device in order to adjust the gondola in an azimuth alignment having an azimuth angle, and to adjust the azimuth alignment. The azimuth angle is tracked using the azimuth adjustment device to a predeterminable azimuth setpoint angle, and the blade misalignment is detected as a function of an azimuth movement of the gondola. Provided herein is detection of aerodynamic imbalances with reduced costs.

16 Claims, 4 Drawing Sheets

(52) U.S. Cl.
CPC .... *F05B 2270/329* (2013.01); *F05D 2260/83* (2013.01)

(56) References Cited

U.S. PATENT DOCUMENTS

| | | | | |
|---|---|---|---|---|
| 2011/0311359 | A1* | 12/2011 | Bjork | F03D 7/0204 416/43 |
| 2012/0230820 | A1* | 9/2012 | Frydendal | F03D 7/0204 416/61 |
| 2019/0390650 | A1* | 12/2019 | Harms | F03D 7/0224 |
| 2020/0056588 | A1* | 2/2020 | Nielsen | F03D 17/00 |
| 2020/0263666 | A1* | 8/2020 | Pedersen | F03D 7/0224 |

* cited by examiner

METHOD FOR DETECTING A BLADE MISALIGNMENT OF A ROTOR BLADE OF A ROTOR OF A WIND TURBINE

BACKGROUND

Technical Field

The present invention relates to a method for detecting at least one blade misalignment of a rotor blade of a rotor of a wind turbine. In addition, the present invention relates to a corresponding wind turbine.

Description of the Related Art

Wind turbines are known, they generate electric current from wind. An aerodynamic rotor having rotor blades is provided for this purpose, which is driven by the wind via the rotor blades. Modern wind turbines have rotor blades which are adjustable in their blade angle. An optimum blade angle can thus be found for every wind situation, and in particular the rotor blades can be rotated entirely or partially out of the wind at high wind velocities, in order to thus avoid an excessively high load.

If the rotor blades are adjusted unevenly, if they thus have different blade angles from one another, an uneven load can result on the rotor. This can also be designated as an aerodynamic imbalance. One blade then has, for example, a higher or lower load than the other blades and this higher or lower load revolves with rotation of the rotor. An asymmetrical, revolving load acting on the rotor thus results. This can particularly have the result that a shear load due to the wind no longer acts solely axially on the rotor axis and thus is also no longer rotationally symmetrical.

Loads are thus generated on the wind turbines by imbalances, which can relate to mass and aerodynamic imbalances. An aerodynamic imbalance thus arises when a blade has a permanent blade angle misalignment, which can also be designated as a pitch misalignment, so that the aerodynamic forces in this blade differ from the other blades.

Minor imbalances can occur and have to be tolerated by the wind turbine, which is also referred to in simplified form as a turbine. Specified imbalances can be provided for this purpose, which are still permissible and have to be complied with, thus cannot be exceeded. It comes into consideration that a wind turbine does not comply with a specified imbalance and then has to be repaired, in particular balanced. Such a repair or balancing can result in high costs.

In principle, the procedure can be that as soon as an imbalance has been quantified, thus its level has been established, and located, thus its location has been established, it can be compensated in order to thus balance the wind turbine. In the case of a pitch misalignment, which in particular causes an aerodynamic imbalance, the blade angle, which can also be designated as a pitch angle, of the affected rotor blade can be corrected by an offset. A rotor blade is also designated in simplified form and synonymously as a blade.

An aerodynamic imbalance, i.e., a pitch misalignment of one or more blades, generates different bending torques in one or more blades, from which a periodic speed change and also periodic loads on the tower are induced. Therefore, such bending torques, periodic speed changes, or periodic loads could be evaluated to detect such aerodynamic loads. Tower oscillations and speed changes are also induced and influenced, inter alia, by the turbine regulation or a mass imbalance, however. Such a detection can thus be difficult and complicated and can therefore cause high costs.

BRIEF SUMMARY

Provided herein is detecting aerodynamic imbalances with reduced costs or reduced additional costs.

A method is proposed. The method thus relates to detecting at least one blade misalignment of a rotor blade of a rotor of a wind turbine having multiple rotor blades adjustable in their blade angle. The blade misalignment describes a blade angle deviation of a detected blade angle of the rotor blade from a reference blade angle (or vice versa). The reference blade angle is in the ideal case the actual blade angle. The actual blade angle is thus the sum of detected blade angle and the blade misalignment. The detected blade angle is a blade angle which a corresponding encoder or another sensor outputs as the blade angle. The blade misalignment is thus to be quantitatively detected in order to be able to calculate the actual blade angle or in order to correct the detected blade angle.

The blade misalignment can also be designated synonymously as an incorrect angle or blade incorrect angle. Such a reference blade angle is in the ideal case the actual blade angle, but it has been recognized that in some cases the deviation from the actual blade angle is not important at all, rather a deviation of the blade angles of the rotor blades among one another, because an aerodynamic imbalance of the rotor can thus arise. Thus, for example, if all three rotor blades are adjusted evenly, thus with the same sign, by 0.5°, no aerodynamic imbalance results. The reference angle can then deviate by this exemplary 0.5° from the actual blade angle. The reference blade angle can then be an average blade angle of all rotor blades, in particular if a setpoint angle predetermined equally for all rotor blades is predetermined, which is also designated as a collective blade angle. Independently thereof, however, it can usually be assumed that the reference blade angle corresponds in each case to the actual blade angle.

Furthermore, it is provided that the wind turbine includes a gondola having the rotor and an azimuth adjustment device. This azimuth adjustment device is provided to adjust the gondola in an azimuth alignment having an azimuth angle. In particular, the azimuth adjustment device is provided to align the rotor with the wind. This typically takes place so that the gondola which carries the rotor is adjusted accordingly. At least one azimuth adjustment motor is provided for such an adjustment, which can also be designated as an azimuth motor. The alignment of the gondola and thus of the rotor can thus be described by the azimuth angle. The azimuth angle thus quantifies the azimuth alignment.

To adjust the azimuth alignment, the azimuth angle is tracked by means of the azimuth adjustment device to a predeterminable azimuth setpoint angle. The azimuth setpoint angle can be predetermined, for example, as a function of a detected wind direction. In the simplest case, the azimuth setpoint angle corresponds to the wind direction or—depending on the definition—is offset thereto by 180°. However, other criteria can also be taken into consideration. In particular, an azimuth setpoint angle is typically tracked to a changed wind direction with a certain inertia. This has the result that the azimuth setpoint angle is a comparatively stable value, which only changes slowly.

If the azimuth setpoint angle changes, the azimuth alignment is thus tracked to the azimuth angle. However, such tracking also comes into consideration if the azimuth setpoint angle remains unchanged or its change can be neglected, but the azimuth alignment changes due to external actions. Especially an uneven wind field acting on the rotor can result in a change of the azimuth alignment.

Such a change of the azimuth alignment is also counteracted by the azimuth adjustment device, which returns the azimuth alignment back to this value.

Furthermore, it is proposed that the blade misalignment is detected as a function of an azimuth movement of the gondola. This is based on the finding here that the aerodynamic imbalance can have the result that the azimuth alignment of the gondola is changed. For example, the aerodynamic imbalance can have the result that a rotor blade absorbs more shear force from the wind due to a misalignment than each of the other rotor blades. If this rotor blade is located during the rotation of the rotor on a first side, for example in the 9 o'clock position, a stronger pressure is exerted on this side of the rotor at the moment, which can result in an azimuth movement of the gondola toward this side. The rotor then rotates further and when the same rotor blade is then in the 3 o'clock position, thus on the other side, the rotor experiences a higher aerodynamic load, thus a higher pressure, here on this other side. This can result in the change of the azimuth alignment of the gondola to this second side.

Of course, the rotor rotates continuously, so that the rotor blade moves continuously from the 9 o'clock position to the 3 o'clock position and accordingly this elevated load in the mentioned example continuously decreases on one side and then continuously increases on the other side until the rotor blade has rotated from the 9 o'clock to the 3 o'clock position. The continued rotation from the 3 o'clock position to the 9 o'clock position then results in the continuous reduction of the load on this second side and increase of the load on the first side.

It has been recognized that the aerodynamic imbalance of the rotor and thus a blade misalignment of a rotor blade is derivable from this azimuth movement of the gondola.

According to one aspect, it is proposed that the blade misalignment is detected as a function of an azimuth movement of the gondola in that an adjustment activity of the azimuth adjustment device is detected. In particular, an azimuth adjustment device includes the at least one azimuth motor, which specifically causes this azimuth adjustment, thus acts as an actuator for the azimuth adjustment. For this purpose, it is proposed that an adjustment activity of the at least one azimuth motor of the azimuth adjustment device is detected.

The azimuth adjustment device, in particular the azimuth motor, thus adjusts the azimuth alignment of the gondola, which is thus an adjustment activity of the azimuth adjustment device or the at least one azimuth motor. This adjustment activity is coordinated by a turbine controller. In particular, target values can be predetermined and actual values are often also recorded. Such actual values can be, for example, motor torques, motor speeds, or motor currents of the azimuth motor. However, other variables of the azimuth adjustment device also come into consideration, including an actual value and/or a setpoint value for the azimuth alignment. In particular electric motors come into consideration as the azimuth motor, however hydraulic drives can also be provided.

In any case, diverse variables of the azimuth adjustment device and/or the azimuth motor are predetermined and/or recorded by the turbine controller and the adjustment activity of the azimuth setting or the azimuth motor can thus be well monitored and evaluated.

It has especially been recognized here that the tracking of the azimuth alignment according to the azimuth setpoint angle is carried out by regulation which records the azimuth actual angle and activates the azimuth adjustment device, in particular the azimuth motor, depending thereon. The influence of an aerodynamic imbalance on the azimuth alignment of the gondola can thus be inferred from the activation signal and/or the behavior of the motor.

It has also been recognized here that not only an azimuth movement can be recognized, but rather particularly a manipulated variable of a regulator also permits conclusions about the acting forces.

It has also been recognized here that if a good or fast regulator is used in the azimuth adjustment device, only comparatively minor azimuth movements occur, since they are regulated out by the regulator. In this case, an observation of an azimuth movement alone can be inaccurate and instead especially the use of a manipulated variable of the regulator can provide a higher level of accuracy. It is therefore proposed that the adjustment activity of the azimuth adjustment device be detected or the adjustment activity of at least one azimuth motor of the azimuth adjustment device be detected.

According to one aspect, it is proposed that the azimuth adjustment device is designed so that it counteracts a change of the azimuth alignment of the gondola due to wind action by way of a position regulation of the azimuth angle. In particular, it is proposed that an azimuth adjustment device is used which does not have a holding brake.

It was particularly recognized here that the wind action is counteracted, specifically regulated against, by the position regulation of the azimuth adjustment device. A holding brake becomes superfluous due to such a position regulation, which could be used in order to hold the gondola in an azimuth alignment as long as the wind direction does not change. It is accordingly proposed that no holding brake be provided. The task of the holding brake is then assumed by the position regulation. If the gondola is thus changed somewhat in its azimuth alignment by the wind, this is possible if no holding brake is provided, but has the result that the position regulation of the azimuth adjustment device counteracts this. The mentioned adjustment activities result precisely in this way, which counteract this change of the azimuth alignment of the gondola due to the wind and can be evaluated to recognize the aerodynamic imbalance.

In particular, the tracking of the azimuth angle takes place continuously. The actual value of the azimuth angle is thus detected continuously and compared to the azimuth setpoint angle, in order to track the azimuth angle to the azimuth setpoint angle depending thereon. The actual value of the azimuth angle is also designated in simplified form here only as an azimuth angle. The continuous tracking naturally also includes an implementation on a digitally operating process computer, particularly if sampling of the actual values is carried out at typical sampling rates.

Due to this continuous tracking, the described signals are thus also provided continuously and therefore also supply a continuous signal curve. It is particularly important that the adjustment activity of the azimuth adjustment device reflects the azimuth movements of the gondola due to the continuous tracking.

According to one aspect, it is proposed that a state observer is used to detect the blade misalignment. Such a state observer thus takes into consideration the azimuth movement of the gondola, in particular the adjustment activity of the azimuth adjustment device or the azimuth motor.

A model can thus be predetermined, which depicts the wind turbine in its behavior. At least one model can be provided which depicts a relevant partial behavior of the wind turbine, which specifically includes the influence of a blade misalignment. The model can operate in parallel to the behavior of the wind turbine or in parallel to the partial behavior of the wind turbine and can be synchronized via at least one output variable. For this purpose, an output variable of the wind turbine or the observed part can be compared to the corresponding output variable of the model in order to synchronize the model as a function of this comparison. The variable to be observed can then be read from the model.

According to one aspect, it is proposed that the state observer for detecting the blade misalignment includes at least one gondola azimuth torque and a blade misalignment as state variables. The state variables are those variables which are observed or estimated in the state observer, which are synonymous terms here.

It has been recognized that the gondola azimuth torque characterizes an important dynamic of the wind turbine in conjunction with an aerodynamic imbalance. From a difference between the gondola azimuth torque and a gondola acceleration torque, which can be calculated from a rotational acceleration of the gondola in the gondola rotational direction, an azimuth drive torque may be calculated and compared to a measured azimuth drive torque in order to adapt the observer states via this.

It can then be compared, filtered as an output variable of the state observer, to an actual azimuth drive torque of the gondola of the wind turbine.

The azimuth drive torque of the gondola, thus the torque with which the gondola is driven for the adjustment, can be detected from the adjustment activity of the azimuth adjustment device. It can particularly be detected from a motor current of the azimuth motor or from all motor currents of all azimuth motors of the azimuth adjustment device.

The blade misalignment of at least one rotor blade, which is thus also a state variable of the state observer and thus a state variable of the model of the state observer, can be read directly as an observed variable from the model. The blade misalignment is thus then also available as a constant variable. The actual blade misalignment can thus be corrected as a function of the observed blade misalignment. It can moreover be continuously monitored or it can be continuously monitored whether a blade misalignment or at least an excessively large blade misalignment occurs.

No additional sensors are required for this purpose if the variables are used which are known from the azimuth adjustment device in any case, which are provided in particular in the turbine controller.

In particular, it is proposed that the state observer includes the gondola azimuth torque, an azimuth torque offset, and the blade misalignment of each of two rotor blades as state variables. The gondola azimuth torque points in a gondola rotational direction and is composed of an azimuth torque component, directed in the gondola rotational direction, of an aerodynamic blade torque ($M_{aero,A}$, $M_{aero,B}$, $M_{aero,C}$) of each rotor blade, and the azimuth torque offset, so that a sum of the torque components of all rotor blades and the azimuth torque offset forms the gondola azimuth torque.

The gondola rotational direction is thus a rotational direction around a tower axis, thus the rotational direction around which the gondola rotates during the azimuth adjustment.

For each rotor blade, an aerodynamic blade torque can be calculated as a function of its aerodynamic properties, the wind velocity, and its blade angle. The aerodynamic blade torque is dependent on its actual blade angle. If it is known, it can be calculated depending thereon via a calculation, which is specified and explained hereinafter.

The actual blade angle is composed of a predetermined or assumed blade angle and a blade misalignment. The assumed blade angle and the blade misalignment can thus also be used instead of the actual blade angle to calculate the aerodynamic blade torque. Particularly for the modelling of the state observer, it can be reasonable to use such a calculation rule as the basis and to conduct it via this blade misalignment of at least one rotor blade as a state variable.

The aerodynamic blade torque fundamentally acts in each case on a blade root of the affected rotor blade. If the affected rotor blade is horizontal, thus in a 3 o'clock position or 9 o'clock position, its aerodynamic blade torque acts in the full dimension as a torque in the gondola rotational direction, thus has maximum component in the gondola azimuth torque. If it is vertical, it does not act at all in the gondola rotational direction, thus has no component in the gondola azimuth torque. This is reflected in each case in an azimuth torque component which can accordingly be calculated in each case from the aerodynamic blade torque and the associated rotor angle.

The transitions between these positions are flowing and the component in the gondola azimuth torque is accordingly dependent on the rotational position of the rotor, thus the rotor angle. This component in the gondola azimuth torque is the azimuth torque component of the aerodynamic blade torque of the affected rotor blade directed in the gondola rotational direction.

The gondola azimuth torque is thus composed of these azimuth torque components, directed in the gondola rotational direction, of all blades, plus the azimuth torque offset. The azimuth torque offset thus includes all remaining components of the gondola azimuth torque which do not originate from the aerodynamic torques of the rotor blades. These include, for example, oblique incident flows on the rotor.

It has especially been recognized that the gondola azimuth torque is the sum of the gondola azimuth torque offset and the aerodynamic blade torques transformed in the gondola rotational direction, thus the azimuth torque components. These azimuth torque components add up to zero in the ideal case, and deviations from this ideal case, that this sum is zero, result from the blade misalignment of the rotor blades. The aerodynamic blade torques are calculated from the blade angle, the blade misalignment, the blade properties, and the wind velocity and transformed in the gondola rotational direction. The offset, thus the azimuth torque offset, comprises all other torques which act on the azimuth drive. These can also include an oblique incident flow. In principle, a permanent offset of a sensor also comes into consideration, such as a decoder possibly provided on the azimuth motor, or another torque sensor, which can have an incorrect zero point.

In the consideration of two misalignments, it is presumed in particular that the wind turbine or its rotor includes precisely three rotor blades. It is also assumed that the sum of all blade misalignments is zero. This is specifically based on the finding here that the main problem of the blade misalignment is that it results in undesired different blade angles of the rotor blades from one another. If the sum of the blade misalignments is zero, this also means that their mean value is zero.

In the stationary case, when all rotor blades are set to the same setpoint angle, the reference blade angle can correspond to the mean value of all detected blade angles. If all blade misalignments are corrected for this purpose, all rotor blades have the same blade angle, namely the reference blade angle. This stationary case is particularly important, since the problem of the aerodynamic imbalance can particularly occur then, but the detection of the blade misalignment is not restricted thereto and the case is only used for illustration. The assumption that the sum of all blade misalignments is zero can also be applied in the nonstationary case, this assumption can particularly underlie the model of the state observer in general.

If two misalignments are thus known, the third misalignment may be determined if the sum of these three misalignments is zero. The state observer can thus be reduced in its order in relation to a variant which uses all three blade misalignments as state variables. The hazard of a linear dependence of state variables among one another is also avoided.

The azimuth torque offset can also be considered as a state variable and can thus be quasi-calculated out. The azimuth torque offset is especially also dynamically considered. It is not absolutely necessary to consider or know this azimuth torque offset as an input variable, it can be sufficient to consider it in the structure of the state observer. The azimuth torque offset, it has been recognized, is slower in its dynamic response than the component of the gondola azimuth torque which is induced by the aerodynamic blade torques, thus the aerodynamic imbalance.

According to one aspect, it is proposed that a Kalman filter is used to detect the blade misalignment as a state observer. It was recognized here that variables such as the wind velocity, the rotor speed, and a motor current can be variables to be detected which are relevant for the observer and they can be noisy. This can be taken into consideration via a Kalman filter, so that it is proposed that such a filter be used.

According to one aspect, it is proposed that the adjustment activity of the azimuth adjustment device takes place with evaluation of an azimuth drive torque, which designates a drive torque with which the gondola is adjusted in its azimuth alignment. In particular, it is proposed for this purpose that the azimuth drive torque is determined as a function of a motor current or motor torque of the at least one azimuth motor. In particular, the azimuth drive torque is determined as a product of the motor current or motor torque and a proportionality factor.

It also comes into consideration that multiple azimuth motors are used. It is then proposed that the azimuth drive torque is determined as a function of multiple motor currents or multiple motor torques of the multiple azimuth motors, in particular that the azimuth drive torque is determined as a product from a sum of the multiple motor currents or a sum of the multiple motor torques and a proportionality factor.

The at least one azimuth motor is used to adjust the gondola in its azimuth alignment, thus to adjust the gondola at all, because the adjustment in the azimuth alignment is the only adjustment which is typically provided for a gondola. It applies a motor torque for this purpose and this can be proportional to the motor current in a typical azimuth motor.

The azimuth drive torque is, neglecting friction losses, proportional to the motor torque. A dynamic response is also neglected here, in particular rigidity and inertia, of a transmission of the azimuth adjustment device. If there were only one azimuth motor, the proportionality factor would correspond to a transmission ratio between azimuth motor and gondola. However, multiple identical azimuth motors are typically provided, so that the number of the azimuth motors is also considered in the proportionality factor. With multiple motors, the azimuth drive torque ideally corresponds to the sum of the converted motor torques. The sum of the motor currents of all azimuth motors can be used as the considered motor current. For simplification, one motor current can also be detected and extrapolated over the number of all motors to form a total current.

It was particularly recognized here that the motor current or the motor torque of the at least one azimuth motor forms a very good foundation to determine the azimuth drive torque. The azimuth drive torque is thus also to be determined well.

If a permanently excited DC machine is used, the motor current is proportional to the motor torque and in this case the motor current and thus the azimuth drive torque can therefore be detected in a simple manner.

The azimuth drive torque thus detected supplies good items of information about the dynamic behavior of the adjustment activity and thus permits good conclusions about the gondola azimuth torque and thus the aerodynamic imbalance, or about the blade misalignments which cause this.

According to one aspect, it is proposed that the azimuth drive torque is used as the output variable of the state observer, so that the state observer outputs an estimated azimuth drive torque and a difference of detected and estimated azimuth drive torque is returned to the state observer as an observation error for adapting observer states.

It was particularly recognized here that the azimuth drive torque is very characteristic for the aerodynamic imbalance or the aerodynamic imbalance is reflected well in the azimuth drive torque. In addition, it was recognized that the azimuth drive torque can be detected well as described above and thus forms a good comparative variable. It was particularly recognized that the azimuth drive torque is also well detectable insofar as a variable proportional thereto is directly detectable, namely the mentioned motor current. The motor torque is accordingly also well detectable.

Instead of directly using the azimuth drive torque, a variable representative thereof can be used, which is designated here as the azimuth drive variable. This can be both detected and estimated in the state observer. The motor torque or the motor current of the azimuth motor comes into consideration as the azimuth drive variable in particular here. The motor torque can be proportional to the azimuth drive torque, wherein a proportionality factor results from a transmission ratio of a transmission between azimuth motor and gondola. A further proportionality factor can be added to the motor current, which specifies a relationship between motor torque and motor current.

According to one aspect, it is proposed that:

a model description underlies the state observer for detecting the blade misalignment, in which:

for each rotor blade an aerodynamic blade torque $M_{aero}$ is described by the equation:

$$M_{aero} = \frac{1}{3} * \frac{1}{2} * \pi * \rho_{air} * c_s(\lambda, \alpha + \gamma) * l_{bl}^3 * (v_{Wind} + \omega_{Yaw} * l_{bl} * \sin(\varphi))^2$$

with:

$$\rho_{air} = \text{air density}$$

$$\lambda = \frac{\omega_{Rot} * l_{bl}}{v_{Wind} + \omega_{Yaw} * l_{bl} * \sin(\varphi)} =$$

speed ratio ($\omega_{Rot}$ = rotor velocity or rotor speed in rad/s)

$l_{bl}$=rotor blade length $\alpha$=blade angle $\gamma$=blade misalignment of the rotor blade $c_s(\lambda,\alpha)$=aerodynamic properties of the rotor blade $\omega_{Yaw}*l_{bl}*\sin(\varphi)$=apparent wind velocity due to an azimuth movement at the rotor blade wherein each blade torque $M_{aero}$ describes a torque acting on the rotor due to the rotor blade, namely in a rotational direction transverse to the axis of rotation of the rotor, and wherein it is provided in particular that the sum of the blade misalignments of all rotor blades is zero and the blade misalignment of one of the rotor blades is calculated from the blade misalignments of the remaining rotor blades, wherein in addition calculations underlie the model description, in which each of the blade torques is transformed by means of an angle transformation as a function of a rotor angle related to the respective blade, which can also be designated as the rotational angle of the rotor, into an azimuth torque component directed in the gondola rotational direction, the gondola azimuth torque is calculated as the sum of the azimuth torque components and the azimuth torque offset, a gondola acceleration torque is calculated as a function of a change of an azimuth speed and a mass moment of inertia of the gondola, an azimuth drive torque is determined as a function of a difference between the gondola azimuth torque and the gondola acceleration torque, wherein the azimuth drive torque, or a variable representative thereof, in particular proportional thereto, forms an output variable of the model of the state observer, and in particular two of the blade misalignments, the azimuth torque offset, and the azimuth torque form system states of the model.

The model underlying the state observer is thus described. According to this model description, an aerodynamic blade torque is determined for each of the three rotor blades, namely from wind velocity, rotor speed, and blade angle. In addition, the aerodynamic blade torque is also dependent on the blade misalignment of the respective blade. The calculation is also based on properties of the rotor blade, which particularly result from its profile, and such properties can be summarized in a coefficient. The coefficient Cs is provided for this purpose.

The coefficient Cs can be designated as the aerodynamic bending torque coefficient. It establishes a quantitative relationship between the wind acting on the blade and the resulting aerodynamic blade torque $M_{aero}$. It is dependent on the aerodynamic properties of the rotor blade and the blade angle. It is known in the design and/or the layout of the rotor blade, but can also be ascertained by studies of the rotor blade and/or simulations of the rotor blade.

In this way, the aerodynamic blade torque, which can be designated in simplified form, but also synonymously, as the blade torque, can be calculated for each of the three rotor blades. The calculation for each rotor blade naturally uses the value assigned to the respective rotor blade. However, most values are equal for all three rotor blades, wherein an identical design is presumed. Of course, the blade misalignment of each individual blade ($\gamma_A$, $\gamma_B$, $\gamma_C$) is or can be different. The blade angles of the rotor blades can also be different, for example, if a single blade regulation is used.

A rotor angle $\varphi$ with respect to the respective blade is also included in the calculation and this rotor angle $\varphi$ is different for each of the three rotor blades, wherein these blade-related rotor angles each differ by 120°. A rotor angle of the rotor of one blade can thus be converted into the rotor angles for the other two blades.

A blade torque is thus a torque which results from the wind engaging on the relevant rotor blade and it thus fundamentally bending around the blade root of the rotor blade. A torque thus results which has an axis of rotation, even if it does not result in a rotation around this axis, which is perpendicular to the rotor axis. If the relevant rotor blade is in the 12 o'clock position, for example, this axis of rotation is horizontal and, as in every position, transverse to the rotor axis. If the rotor blade is in the 9 o'clock position or in the 3 o'clock position, this axis of rotation, which is insofar imaginary, is arranged vertically. This axis of rotation thus changes its position with the rotation of the rotor.

Each blade torque is then converted via an angle transformation into an azimuth torque component. The azimuth torque component thus describes an azimuth torque, i.e., a torque around the vertical tower axis, which is induced solely by the relevant rotor blade by a wind coming directly from the front. This azimuth torque component is thus dependent on the rotor angle, i.e., the rotational angle of the rotor, in relation to the respective blade. In the 12 o'clock position or in the 6 o'clock position of the relevant rotor blade, the azimuth torque component is thus zero, whereas it corresponds to the aerodynamic blade torque in the 3 o'clock position or 9 o'clock position of the relevant rotor blade. Values in between accordingly result at the remaining rotor angles.

A wind which flows horizontally in the direction of the rotor axis and does not include any other wind components is designated as a wind directly from the front here. It thus flows in accordance with the azimuth alignment of the gondola. Other wind components can occur and also act on the rotor blade, but they are not considered via the aerodynamic blade torque, rather via an azimuth torque offset.

Three azimuth torque components thus result and these are added up and in addition the azimuth torque offset is also added on. This azimuth torque offset fundamentally corresponds to the other force actions which can result due to oblique incident flows or other wind influences, which are not reflected in the (idealized) wind velocity, which is incorporated in the calculation of the aerodynamic blade torques and is moreover assumed to be equal for all three rotor blades.

The resulting azimuth torque is designated as the gondola azimuth torque. It is thus the sum of all partial torques which results from forces acting externally on the gondola, thus in particular forces which act externally on the rotor.

For the blade misalignment, it is assumed that its sum is zero, and therefore one of the blade misalignments may be calculated from the other two, wherein a rotor having three rotor blades is presumed.

In addition, the change of an azimuth speed is observed. This can take place particularly in that a rotor speed of an azimuth motor is detected and converted via a transmission gearing into a speed of the azimuth movement, thus the movement of the gondola around the vertical tower axis. The direct azimuth speed is naturally very low and can include, for example, a rotational movement by a few degrees, for example a few degrees per second or less. However, a variable representative thereof, in particular a variable proportional thereto can be used, in particular a speed of the azimuth motor, thus the motor speed.

This speed, whether it is the motor speed or the azimuth speed, is derived according to time and possibly multiplied by a proportionality factor, especially a transmission ratio between azimuth motor and gondola, to obtain an azimuth acceleration. This azimuth acceleration is multiplied by the mass moment of inertia of the gondola, from which a gondola acceleration torque results. The gondola acceleration torque thus describes a torque which would accelerate the gondola around the calculated azimuth acceleration if no external forces were present, thus if the gondola azimuth torque were zero.

In any case, a difference is formed of gondola azimuth torque and gondola acceleration torque and an azimuth drive torque results therefrom. This azimuth drive torque forms an output variable of this model description, thus this model of the state observer. In particular, however, a torque representative, in particular proportional to the azimuth drive torque is output, namely in particular a motor torque of an azimuth motor. This motor torque then thus forms the output of the model and can be compared to a detected motor torque. The difference therefrom can be used to adapt the state variables of the state observer or the state observer model. This takes place in a manner known from the theory of the Kalman filter.

In particular, it is proposed that two of the blade misalignments, the azimuth torque offset, and the gondola azimuth torque form system states of the model. These four states are those which are adapted upon the return of the difference between estimated and detected output variable, thus the difference between motor torque as an output variable of the observer and detected motor torque. An estimated variable or estimated state can also be designated synonymously as an observed variable or observed state.

According to one aspect, it is proposed that a model description underlies the state observer, which can be described by the following equation system, wherein the rotor includes three rotor blades A, B, and C:

$$M_{aero,A} = f(v_w, n_R, \alpha, \gamma_A); M_{aero,B} = f(v_w, n_R, \alpha, \gamma_B);$$

$$M_{aero,C} = f(v_w, n_R, \alpha, \gamma_C);$$

$$M_{yaw,A} = f(M_{aero,A,\varphi}); M_{yaw,B} = f(M_{aero,B,\varphi}); M_{yaw,C} = f(M_{aero,C,\varphi})$$

$$\gamma_c = -\gamma_A - \gamma_B$$

$$M_{yaw,Nac} = M_{yaw,A} + M_{yaw,B} + M_{yaw,C} + M_{yaw,off}$$

$$M_{acc} = i_{ge} \cdot i \frac{dn_{DRV}}{dt} \cdot J_{Nac}$$

$$M_{DRV} = \frac{1}{i_g} \cdot (M_{yaw,Nac} - M_{acc})$$

with:

$M_{aero,A}$, $M_{aero,B}$ and $M_{aero,C}$: aerodynamic blade torque $M_{aero}$ of the rotor blade A, B, or C, respectively;

$v_w$: wind velocity; $n_R$: rotor speed; $\alpha$: blade angle; $\varphi$: rotor angle $M_{yaw,A}$, $M_{yaw,B}$, and $M_{yaw,C}$: azimuth torque component of the rotor blade A, B, or C, respectively;

$\gamma_A$, $\gamma_B$ and $\gamma_C$: blade misalignment of the rotor blade A, B, or C, respectively;

$M_{yaw,off}$: azimuth torque offset;

$M_{yaw,Nac}$: gondola azimuth torque;

$M_{acc}$: gondola acceleration torque;

$$M_{acc} = i_{ge} \cdot 2\pi \frac{dn_{DRV}}{dt} \cdot J_{Nac};$$

$i_{ge}$: transmission ratio between azimuth motor and gondola;

$n_{DRV}$: speed of azimuth motor;

$J_{Nac}$: mass moment of inertia of gondola $M_{DRV}$: motor torque of azimuth motor or sum of all azimuth motor torques if multiple azimuth motors are used.

The model which is used in the state observer is thus described by the above equations.

The calculation of the aerodynamic blade torque $M_{aero}$ of each rotor blade can be carried out by the equation specifically specified above. The azimuth torque component of each rotor blade is calculated from the aerodynamic blade torque $M_{aero}$ in each case by an angle transformation as a function of the rotor angle.

The azimuth torque offset only occurs as a partial component in the sum for calculating the gondola azimuth torque. It can be understood as an interfering variable and forms a state variable of the state observer and is equalized by the return of the observer error.

The blade misalignments, at least two of them, can also be understood as an interfering variable. They each form a state variable of the state observer and are equalized by the return of the observer error and thus determined at all for the first time. For these blade misalignments in the model, this also applies to the azimuth torque offset, initial values can be predetermined in the calculation in the state observer, for which the value zero is preferably selected.

It is particularly proposed for the model of the state observer, both according to this aspect and also according to the other aspects, that the rotor angle, a wind velocity, a rotor speed, a collective blade angle, and a motor speed of an azimuth motor are used as input variables. Instead of the collective blade angle, an individual blade angle can also be used in each case for each rotor blade.

The motor torque of the azimuth motor can be selected as an output variable of the model and thus of the state observer.

Moreover, a method for correcting at least one blade misalignment of a rotor blade of a wind turbine according to at least one aspect of at least one above-described method for detecting a blade misalignment is proposed. This method is thus provided to correct at least one blade misalignment of a rotor blade of a rotor of a wind turbine having multiple rotor blades adjustable in their blade angles. The blade misalignment describes a blade angle deviation of a detected blade angle of the rotor blade from a reference blade angle, which was also already explained above for the method for detecting a blade misalignment.

This is also based here on a wind turbine which includes a gondola having a rotor and an azimuth adjustment device in order to adjust the gondola in an azimuth alignment having an azimuth angle. The azimuth angle is also tracked by means of the azimuth adjustment device to a predeterminable azimuth setpoint angle here to adjust the azimuth alignment. The blade misalignment is detected as a function of an azimuth movement of the gondola. In particular, this is carried out using a method according to at least one of the above-described aspects.

Furthermore, it is proposed that a correction angle is determined for each rotor blade as a function of the respective detected blade misalignment and the blade angle is corrected by the correction angle.

It was particularly recognized here that such a correction by such a method is also possible online. It is thus possible to avoid that a blade misalignment first has to be recognized, for example in an off-line method, and then an equalization can be performed in order to compensate for such a blade misalignment. Instead, the blade misalignment can be detected as a function of an azimuth movement of the gondola and then converted into a correction value.

It is particularly advantageous here that the proposed method can also run continuously and the blade misalignments can be output particularly as observed states. The method operates so that in particular the knowledge of a correction carried out once is not necessary, thus is not incorporated in the method, in particular is not incorporated into the proposed state observer. The detection method thus does not have to be adapted to a correction which is carried out and can also run continuously in running operation.

Blade misalignments can often have their causes in production errors or turbine errors and are supposed to occur only at the beginning or after a component change. This means that when a blade misalignment does occur during operation, it is probable that there is damage on the wind turbine. Such damage can be present, for example, on the rotor blade, or it can also be present on a rotary encoder of the corresponding blade angle or blade angle adjustment system. Such damage can also be detected by the proposed method. It can initially be corrected, however, it is preferably proposed that a warning is additionally output upon recognizing such a blade misalignment in running operation, so that a check of the cause of the blade misalignment can be carried out.

It is therefore proposed according to one aspect that a detected blade misalignment is compared to a predeterminable deviation limiting value, and an error message or warning message is output if the detected blade misalignment is greater in absolute value than the deviation limiting value. Such a deviation limiting value can in particular be in the range of 0.2° to 2°.

According to one aspect, it is proposed that the correction angle corresponds to the detected blade misalignment, or the correction angle is tracked to the detected blade misalignment, in particular with a delay function, which in particular includes a time constant of at least one hour.

It was particularly recognized here that in this way an online implementation and even a fully automatic implementation is possible. The detected blade misalignment can be implemented directly as a correction value. Interactions with other regulating dynamics are precluded due to the very slow tracking.

Due to the particularly preferred embodiment having a long delay time in the implementation, this can especially have the result that during the correction implementation, all three rotor blades are equalized uniformly, so that overall all blade misalignments are corrected to zero.

A wind turbine is also proposed, which includes a rotor having multiple rotor blades adjustable in their blade angles, wherein

- the wind turbine includes a gondola having the rotor and an azimuth adjustment device in order to adjust the gondola in an azimuth alignment having an azimuth angle, and
- to adjust the azimuth alignment, the azimuth angle is tracked by means of the azimuth adjustment device to a predeterminable azimuth setpoint angle, wherein
- the wind turbine includes a control unit (e.g., controller), which is prepared to execute a method according to one of the preceding aspects.

A corresponding program can particularly be implemented in the control unit, which executes the method for detection according to at least one above-described aspect and/or executes a method for correcting a blade misalignment according to at least one above-described aspect.

BRIEF DESCRIPTION OF THE SEVERAL VIEWS OF THE DRAWINGS

The invention is explained in more detail by way of example hereinafter with reference to the appended figures.

DETAILED DESCRIPTION

Figure 1:
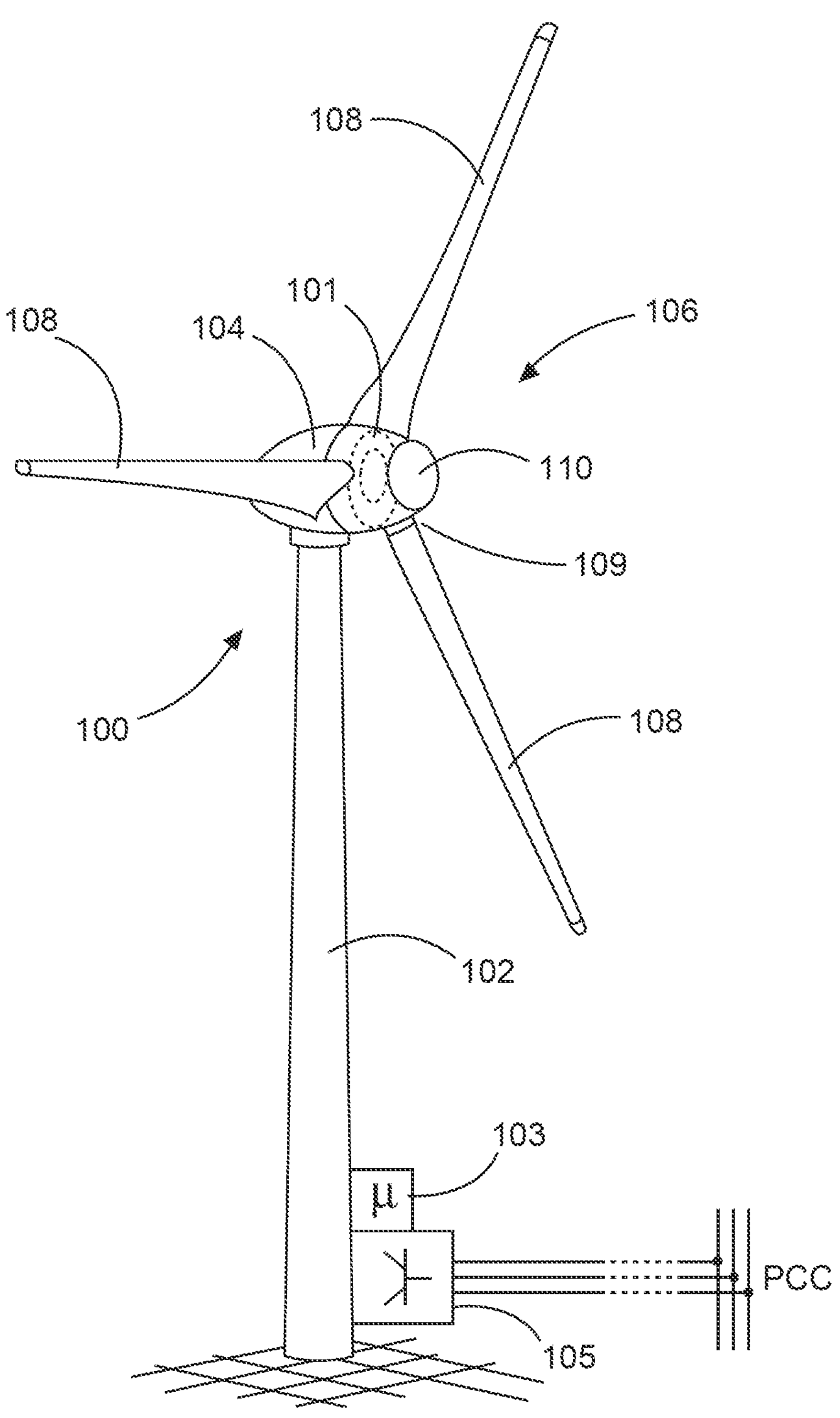
FIG. 1 shows a wind turbine in a perspective illustration.

FIG. 1 shows a wind turbine 100 having a tower 102 and a gondola 104. A rotor 106 having three rotor blades 108 and a spinner 110 is arranged on the gondola 104. The rotor 106 is set into a rotational movement by the wind in operation and thus drives a generator in the gondola 104.

The wind turbine 100 includes an electrical generator 101, which is indicated in the gondola 104. Electrical power can be generated by means of the generator 101. A feed unit 105, which can be designed in particular as an inverter, is provided to feed electrical power into an electrical supply grid at a grid connection point PCC. A turbine controller 103 is provided to control the wind turbine 100 and also the feed unit 105.

Figure 2:
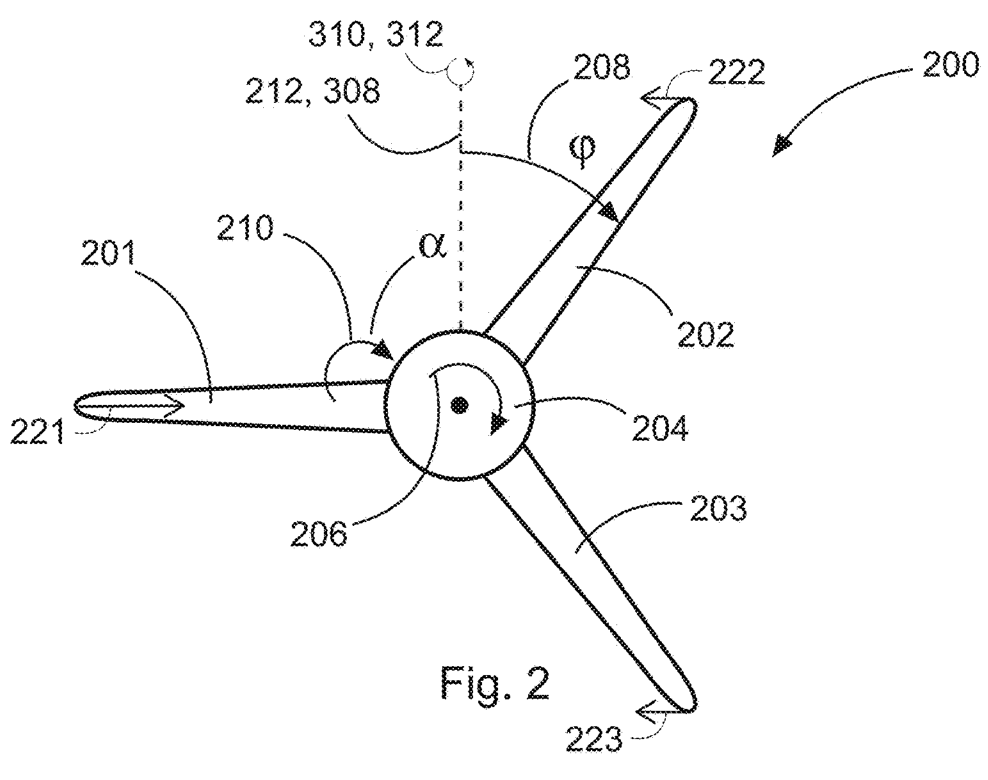
FIG. 2 schematically shows a rotor of a wind turbine in a front view.

FIG. 2 shows a rotor 200 having 3 rotor blades 201, 202, and 203 in a top view from the front of a spinner 204. The rotor 200 is thus shown in FIG. 2 from the viewpoint of the wind. In operation, the wind results in a rotation of the rotor 200 in rotor rotational direction 206. The rotor 200 and thus each rotor blade 202 therefore has a rotor angle 208, which is also designated by the Greek letter $\varphi$.

The rotor angle 208 or $\varphi$ can be related to a rotor reference angle 212, which is shown by way of example in FIG. 2 as a dashed vertical line. Accordingly, if this vertical were the reference variable and for a rotor blade which stands vertically upward (12 o'clock position), the rotor angle would thus have the value zero.

Only one rotor angle is shown by way of example for a rotor blade in FIG. 2. A rotor angle results accordingly for the other two rotor blades, which is greater or less by 120° or 240°.

A blade angle direction 210 is also shown by way of example in FIG. 2, however only by way of example for a rotor blade in which the relevant rotor blade can be adjusted in its rotor blade angle $\alpha$.

In FIG. 2, the azimuth torque components are indicated by reference numerals 221, 222, and 223, respectively. Also, in FIG. 2, a tower axis 308, a gondola rotational direction 310, and a gondola azimuth torque 312 are indicated.

Figure 3:
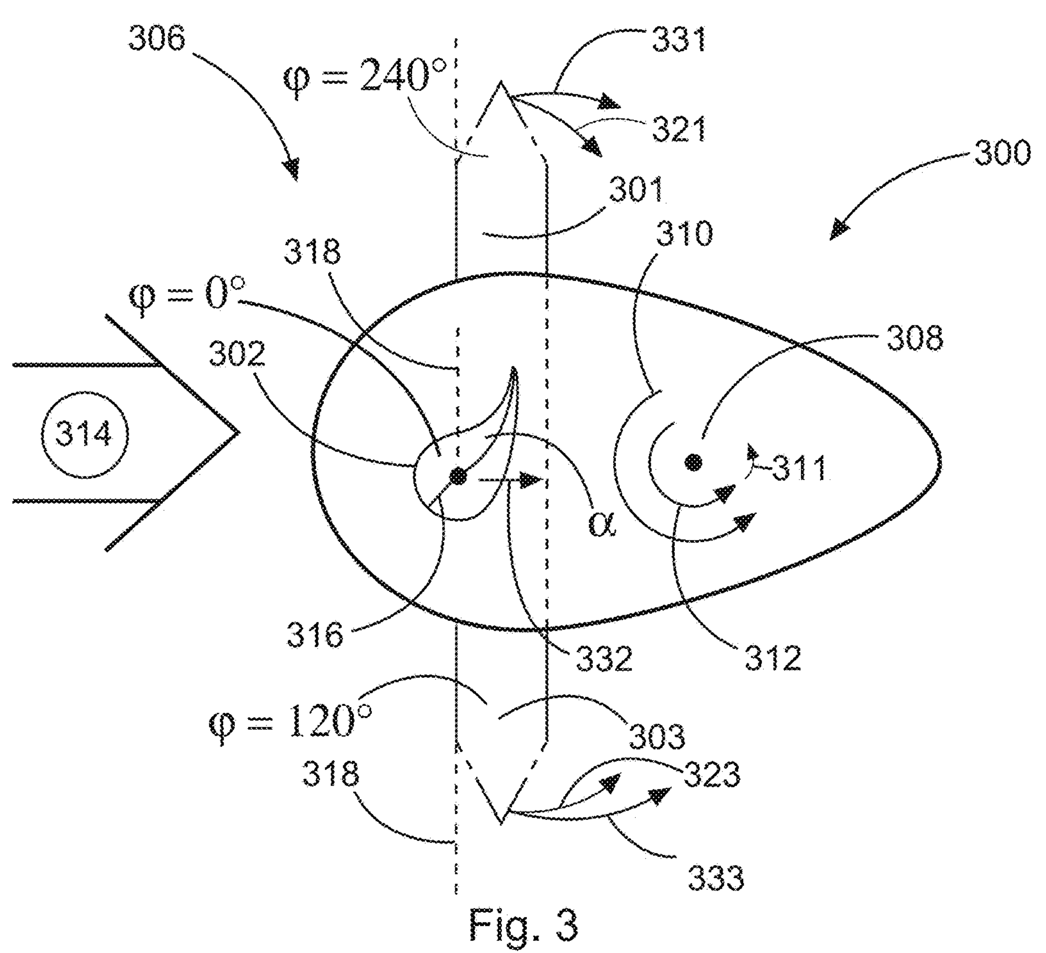
FIG. 3 schematically shows a gondola having a rotor in a top view.

FIG. 3 schematically shows a gondola 300 in a top view. It includes a rotor 306 having a first, second, and third rotor blade 301, 302, and 303. The second rotor blade 302 is located here in a 12 o'clock position, thus stands vertically upward. The first and third rotor blades 301, 303 are in an 8 o'clock or 4 o'clock position, respectively.

The gondola 300 is rotatable around a vertical tower axis 308 in the gondola rotational direction 310, thus adjustable in its azimuth alignment. A gondola azimuth torque 312 thus also points in this gondola rotational direction 310.

As an illustration, a wind 314 acting on the gondola 300, and thus the rotor 306, is shown or indicated in FIG. 3. The wind 314 acts on each of the three rotor blades 301 to 303 and thus results in each case in an aerodynamic blade torque 331 to 333 at the respective rotor blade 301 to 303. Each of these aerodynamic blade torques 331 to 333 results in each case in an azimuth torque component directed in the gondola rotational direction 310. This is dependent on the rotor angle $\varphi$, which bears the reference sign 208 in FIG. 2.

How strongly and in which direction the respective aerodynamic blade torque 331 to 333 contributes to the gondola azimuth torque 312 is thus dependent on this rotor angle $\varphi$. According to the definition of the rotor angle $\varphi$ or 208 of FIG. 2, the respective azimuth torque component is calculated from the respective aerodynamic blade torque 331 to 333, multiplied by $\sin(\varphi)$. The azimuth torque component of the first rotor blade 301 is thus directed counter to the gondola azimuth torque 312, whereas the azimuth torque component of the third rotor blade 303 points in the direction of the gondola azimuth torque 312. With uniform wind, the azimuth torque components of the first and third rotor blade 301, 303 can cancel out in the position shown, and thus the azimuth torque components of all three rotor blades can cancel out, since the second rotor blade 302 has an azimuth torque component having the value zero in the vertical position.

However, if the individual rotor blades experience different forces from the wind and thus different aerodynamic blade torques, because their blade angles $\alpha$ are different, they do not cancel out, and result in a perceptible component of the gondola azimuth torque 312. This component changes due to rotation of the rotor, in particular cyclically and with changing sign.

The gondola azimuth torque 312 additionally has a further component due to an azimuth torque offset, which is not shown in FIG. 3, however.

For illustration, a blade profile is indicated for the second rotor blade 302 in FIG. 3, and a blade angle $\alpha$ is also shown therein for illustration. It is assumed here that an alignment of the rotor blade, namely of the second rotor blade 302 here, with its blade chord 316 in the direction of a rotor plane 318 corresponds to the blade angle zero. The blade angle $\alpha$ shown here by way of example thus has a blade angle $\alpha$ to this rotor plane 318, which in the example shown or the snapshot shown has approximately the value of 30°. In a part-load operation, the rotor blade angle $\alpha$ typically has a value of approximately 0° to 5°.

Such a blade angle $\alpha$ is predetermined identically for all rotor blades and is designated as the collective blade angle. An individual component can optionally be overlaid. Instead of the collective blade angle, an individual blade angle can also be used in each case for each rotor blade if a single blade adjustment is used. An individual component can then also be overlaid.

The blade misalignment to be detected is thus the deviation of a detected blade angle from the actual blade angle $\alpha$, or from another reference blade angle, which is not shown in FIG. 3. The blade misalignment is to be detected individually for each rotor blade but can be detected in a common process.

In FIG. 3, azimuth torque components are indicated by reference numerals 321 and 323. Also, FIG. 3 shows an azimuth torque offset 311. In addition, rotor angles $\varphi$ of the three blades are indicated in FIG. 3.

Figure 4:
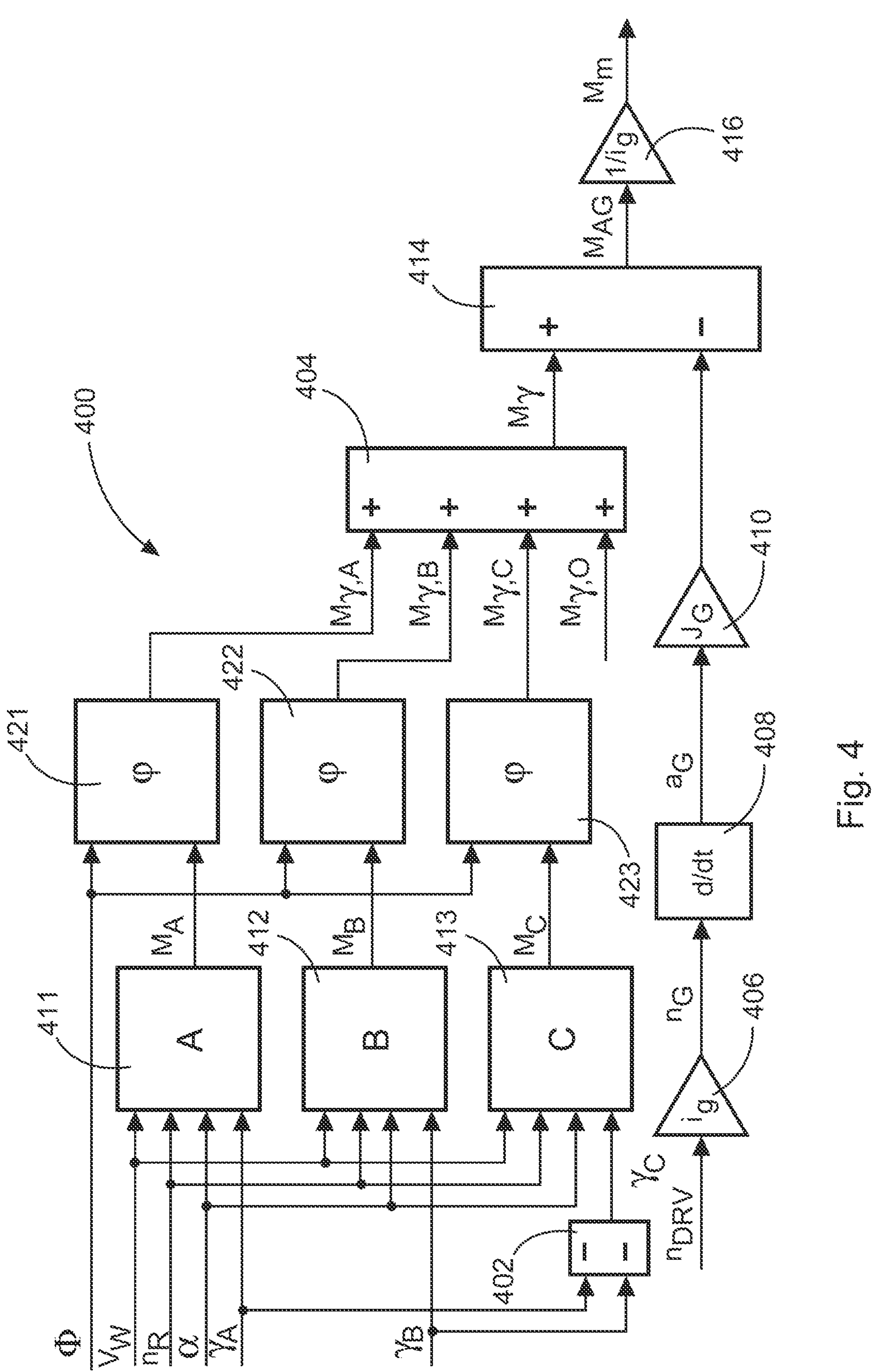
FIG. 4 schematically shows a model of a proposed state observer in a block diagram.

To detect the blade misalignment of each rotor blade, the use of a state observer is proposed, which is based on a model that is shown in FIG. 4. FIG. 4 thus shows a model 400, in which a rotor angle $\varphi$, a wind velocity $V_W$, a rotor speed nr, and a collective blade angle $\alpha$ are entered as input variables. It is assumed here that individual blade control is not provided, so that the same setpoint value for the blade angle is provided for each rotor blade. This is set for each rotor blade, wherein then the set rotor blade angle deviates in each case from the setpoint value by the blade misalignment. A motor speed $n_{DRV}$ of an azimuth motor is also entered as an input variable.

Furthermore, a blade misalignment $\gamma_A$ of a first rotor blade A, a second blade misalignment $\gamma_B$ of a second rotor blade B, and a third blade misalignment $\gamma_C$ of a third rotor blade C are taken into consideration. The actual rotor blade angle of the respective rotor blade then deviates by this blade misalignment from the setpoint value, thus the collective blade angle $\alpha$. The first two blade misalignments $\gamma_A$, $\gamma_B$ are shown as input variables, but are not input as input variables in the model 400. They are to be determined by the state observer using this model 400 and each form a system state of the observer.

The third blade misalignment $\gamma_C$ is calculated from these two first blade misalignments $\gamma_A$, $\gamma_B$. It corresponds to the negative value of the sum of both first two blade misalignments $\gamma_A$ and $\gamma_B$. The subtraction block 402 is provided for this purpose. If the assumption that the sum of all three blade misalignments is zero is not made, the third blade misalignment $\gamma_C$ can also be used as an additional input variable.

The model 400 calculates for each of the three rotor blades A, B, and C in an aerodynamic block 411 to 413 an aerodynamic blade torque $M_{aero,A}$, $M_{aero,B}$, and $M_{aero,C}$, which are only shown as MA, MB, and Mc in FIG. 4 for better clarity.

Each of these aerodynamic blade torques MA, MB, and Mc is transformed in a corresponding first, second, or third transformation block 421 to 423 with further consideration of its rotor angle into an azimuth torque component $M_{yaw,A}$, $M_{yaw,B}$, and $M_{yaw,C}$ which are shown as $M_{y,A}$, $M_{y,B}$, and $M_{y,C}$ in FIG. 4 for better clarity.

To consider their respective rotor angle, the transformation blocks 421 to 423 receive the general rotor angle $\varphi$ as an input variable and convert this accordingly into the individually applicable rotor angles, in that the rotor angle $\varphi$ is increased or decreased by 120° or 240° if necessary.

Via the summation block 404, the three azimuth torque components $M_{y,A}$, $M_{y,B}$, and $M_{y,C}$ are added up to form the gondola azimuth torque My, wherein an azimuth torque offset $M_{y,O}$ is also added. The gondola azimuth torque My stands as a simplification for the formula symbol $M_{yaw,Nac}$, and the azimuth torque offset $M_{y,O}$ stands as a simplification for the formula symbol $M_{yaw,Offset}$.

The azimuth torque offset $M_{y,O}$ is shown as an input variable, but is not input into the model, rather forms a system state of the model and thus of the state observer, which is to be ascertained by the state observer. The gondola azimuth torque My is also a system state in this model and thus the state observer.

The model 400 also considers the motor speed $n_{DRV}$ as an input variable, which is converted via a transmission factor $i_g$ in the first amplification block 406 into a gondola speed $n_G$. The transmission factor $i_g$ designates the transmission ratio of an adjustment transmission between azimuth motor and gondola. The transmission ratio $i_g$ can also be designated by the formula symbol $i_{ge}$ or $i_{gear}$.

In the derivation block 408, the gondola speed no is derived according to time, so that a gondola acceleration ac results. For the sake of simplicity, a factor of $2\pi$ was omitted in the illustration. In the second amplification block 410, this gondola acceleration ac is calculated using the mass moment of inertia $J_G$ to form the gondola acceleration torque MA.

The mass moment of inertia $J_G$ of the gondola can also be designated by the formula symbol $J_{Nac}$. The gondola acceleration torque MA can also be designated by the formula symbol $M_{acc}$.

In the difference block 414, the difference of the gondola azimuth torque My and the gondola acceleration torque MA is formed, so that an azimuth drive torque MAG results. This can be multiplied in the third amplification block 416 by the inverse transmission ratio $i_g$, so that the motor torque Mm results, for which the formula symbol $M_{Motor}$ can also be used.

The azimuth drive torque $M_{AG}$ and the motor torque $M_m$ form the output variable of the model and thus the output variable of the state observer. This estimated motor torque is compared to a detected motor torque, and returned via a corresponding feedback into the model in order to equalize the system states, thus the first blade incorrect angle $\gamma_A$, the second blade incorrect angle $\gamma_B$, the azimuth torque offset $M_{y,O}$, and the gondola azimuth torque $M_Y$.

The following was thus recognized and the following solutions were proposed.

Automatic detection of an aerodynamic imbalance based on a Kalman filter and a position-regulated azimuth drive is particularly proposed.

In wind turbines having azimuth holding brake, an aerodynamic imbalance results in a tower torsion, which is difficult to detect metrologically. Using the proposed use of position-regulated azimuth adjustment devices, such a holding brake is omitted in operation, since the drive is position-regulated and thus holds against the torque. Aerodynamic imbalances in the azimuth movement, which forms a regulation error, and in the drive torque of the motors, which forms a manipulated variable for the azimuth adjustment device, thus become visible.

A solution is proposed here in which Kalman filters, which are regulation observers in the broader meaning, observe the online estimation of parameters and the observation of regulation states. One advantage of such a solution is the lean structure and simple parameterization.

With a position-regulated azimuth adjustment device, the azimuth drive does not have a holding brake as in previous azimuth systems, because it is position-regulated. This means the motors are regulated so that the regulating error (difference of setpoint position and actual position) is as small as possible in that the motor torque is used as a manipulated variable. This means that the azimuth drive yields somewhat in the event of a torque, for example from the wind, and then actuates the setpoint position again.

The moment of the motor is proportional to the current and can thus be ascertained. In addition, each motor has a speed sensor and the gondola movement is thus also very well known due to the large transmission ratio of >1:1000.

The aerodynamic imbalance results in a gondola azimuth torque which is dependent on the blade position, thus the rotor angle of the blade misalignment and the wind velocity. This torque is counteracted by the motors of the azimuth drive and the inertia of the gondola.

The aerodynamic imbalance is estimated continuously and online based on the azimuth movements of the gondola with the aid of a Kalman filter. A detection of the azimuth drive torque is an important requirement. Alternatively, the gondola azimuth torque could also be detected, which can be ascertained at the position-regulated azimuth drive from the azimuth speed or its change and the torque of the azimuth motors.

The Kalman filter has a total of 4 states:

gondola azimuth torque blade misalignment blade A blade misalignment blade B azimuth torque offset.

In this case, the gondola azimuth torque is the sum of the offset and the aerodynamic torques which results from the pitch misalignment of blade A, B, and C, which can also be designated synonymously as the blade misalignment. The aerodynamic torques are calculated from the pitch angle, which can also be designated synonymously as the blade angle, the pitch misalignment, the blade properties, and the wind velocity. The offset comprises all other torques which act on the azimuth drive, for example due to an oblique incident flow.

The azimuth motor torque is used as a "measured value" in the meaning of the Kalman filter, which is compared to the sum of the gondola azimuth torque and the acceleration torque (moment of inertia multiplied by azimuth acceleration). The Kalman filter now progressively optimizes the internal states, thus the states of the model of the Kalman filter, until the "measured value" from the Kalman filter corresponds in the best possible manner with the real measured value.

As a result, after a short time the pitch misalignments in blade A, B, and C are obtained, wherein it is assumed that the sum of all pitch misalignments corresponds to 0°.

Subsequently, the pitch misalignment can be corrected automatically in operation of the wind turbine and the imbalance can thus be avoided.

Particularly the following can be achieved or is to be achieved as much as possible using the proposed solution:

1. Optimizing the turbine operation: Pitch misalignments result in a yield reduction of the wind turbine and increased sound emissions depending on the degree of the misalignment.
2. Maintaining the certification conditions: The certification of the wind turbine is presently based on the assumption that the pitch angles deviate at most by +/−0.3° from one another.
3. Load reduction/possible cost saving: Due to the automated recognition and elimination of the aerodynamic imbalance, the assumed pitch error, thus the pitch misalignment of +/−0.3° in simulations, in particular blade load simulations, can be reduced, by which a load reduction is achieved. A lesser aerodynamic imbalance reduces the load on the azimuth drive, due to which potentially fewer or weaker motors can be used.

The following alternative approaches can be avoided or improved:

Visual methods: The pitch angle is checked visually→Disadvantage: no turbine operation; complex measurement technology required; manual procedure.

Monitoring the tower torsion: If the azimuth torque is not known, the azimuth torque can also be ascertained from the tower torsion. However, this requires complex measurement technology and is thus quite costly.

Automatically recognizing the aerodynamic imbalance in operation of the wind turbine without additional hardware is sought.

This subsequently enables the correction of the pitch misalignment by adding an offset to the respective pitch angle.

The following advantages result:

Cost savings: no additional costs in the case of an azimuth adjustment device which uses a position regulation.

Minimizing risks: In all wind turbines, the aerodynamic imbalance is monitored and corrected and not only in conspicuous turbines.

Simplified and shortened startup: A determination of the aerodynamic imbalance by an external service provider can be omitted.

Simple software care and parameterization: Many parameters describe the physics of the wind turbine and are known or only have to be specified in their order of magnitude.

No dependencies for the regulation of the wind turbine and no cross-sensitivity to windshear, turbulence, or mass imbalance.

After approximately 10 minutes of operation of the wind turbine, the pitch misalignments of all blades are known.

The following is to be added to the Kalman filter used.

The Kalman filter operates so that it adapts system states of its model in dependence on a comparison of the output variable of the model and a corresponding measured variable of the system. The adaptation takes place so that a difference between the output variable of the model and the corresponding measured variable of the system is minimized. It is assumed that the measured variable and also the system states to be observed can have measurement noise.

A time-discrete description is used in the system description and therefore also in the model. Variables are observed therein at the current discrete point in time k and at the prior point in time k−1, thus at the step k and at the prior step k−1.

The states xx for the step k are calculated therein as a function of the states of the prior step k−1 and as a function of input variables $u_k$ for the current step k. The following generalized relationship reflects this:

$$x_k = f(x_{k-1}, u_k)$$

For the blade misalignments and the azimuth torque offset, it can be assumed that they are constant over time. The following then applies for them $x_k=x_{k-1}$.

The states are represented by the vector $x_k$, in which all observed states are combined. The input variables are represented by the vector $u_k$. In simple systems, only one state and/or only one input variable could also be present, which is not the case here, however.

Furthermore, it is presumed that the states have noise, having the covariance Q.

Measured values $z_k$, thus output variables of the model, are calculated directly as a function of system states $x_k$ and input variables $u_k$, which the following generalized relationship reflects:

$$z_k = h(x_k, u_k)$$

The measured values are represented by a vector $z_k$. In the present case, or according to a proposed aspect, however, only one measured value or only one output variable is present.

It is assumed that the measured variables have a noise R.

In the prior equations, $f(x_{k-1},u_k)$ and $h(x_k,u_k)$ can be designated as transfer functions, namely as the state transfer function $f(x_{k-1},u_k)$ and as the output transfer function $h(x_k, u_k)$. Their generalized representation indicates that the transfer functions can be nonlinear.

The mode of operation of the Kalman filter can be divided into two parts.

A prediction can be viewed as the first part. A linearization of the transfer functions is carried out:

$$F_k = \left.\frac{\partial f(x, u)}{\partial x}\right|_{x_{k-1}, u_k} \text{ and } H_k = \left.\frac{\partial h(x, u)}{\partial x}\right|_{x_k, u_k}$$

The linearization is thus carried out by partial derivation of the functions according to the respective states, specifically at the points $x_{k-1}$ Or $x_k$ and $u_k$. A linearized state transfer matrix $F_k$ and an output transfer matrix $H_k$ result.

The states $x_k$ are predicted by the above-described relationship or calculated for this purpose, thus using the generalized relationship:

$$x_k = f(x_{k-1}, u_k)$$

In addition, a covariance of the observed states is predicted as the covariance matrix $P_k$ of the estimated values. The covariance matrix $P_k$ of the estimated values can also be designated synonymously as the covariance matrix $P_k$ of the observed states. For the prediction, it can be calculated for this purpose from a prior covariance matrix $P_{k-1}$, the linearized state transfer matrix $F_k$, and the covariance matrix $Q_k$ of the process noise, which thus identifies a process noise that is superimposed on the current system states by input variables. The covariance matrix $P_k$ of the estimated variables is calculated according to the equation:

$$P_k = F_k * P_{k-1} * F_k^T + Q_k$$

The correction, namely of the states, can be viewed as the second part.

For this purpose, initially a residual covariance matrix $S_k$ is calculated, namely from the current output transfer matrix $H_K$, the covariance matrix $P_K$ of the estimated values, and a measured variable covariance matrix $R_k$:

$$S_k = H_k P_k H_k^T + R_k$$

With the aid of the covariance matrix $P_k$ of the estimated values of the output transfer matrix $H_K$ and residual covariance matrix $S_k$, the return amplification matrix $K_k$ can be calculated, which can also be designated as optimal amplification:

$$K_k = P_k H_k^T S_k^{-1}$$

Based thereon, the states $x_k$ are adapted in the observer, which can also be designated as updating these states $x_k$. For this purpose, a difference is calculated from the measured output variable $z_k$ and its calculation from the estimated states $x_k$ of the observer and the input variables $u_k$ of the observer, according to the output transfer function $h(x_k,u_k)$, using the following equation:

$$x_k = x_k + K_k(z_k - h(x_k, u_k))$$

A difference between measured and observed output variable is thus multiplied by the optimum amplification and added to the current states.

Finally, in preparation for the next step, an update of the current covariance matrix $P_k$ of the estimated values, thus the observed system states, is carried out according to the following equation:

$$P_k = (I - K_k H_k) P_k$$

The covariance matrix $P_k$ of the estimated values thus updated is then required in the next step in order to predict, thus to calculate, the new covariance matrix in the first part, namely the prediction, as was shown above. For this purpose, the covariance matrix $P_k$ of the estimated values of this step thus updated forms the prior covariance matrix $P_{k-1}$ in the next step.

All of these calculations are repeated step-by-step, so that the now current step is then the prior step.

The Kalman filter is thus a recursive method, in which the return amplification matrix $K_k$, which can also be designated as a correction matrix or correction vector, is newly determined or adapted in each step.

In summary, in each case for the step k:

$x_k$: observed states
$u_k$: input value
$z_k$: output variable
$F_k$: state transfer matrix
$H_k$: output transfer matrix
$K_k$: return amplification matrix
$P_k$: covariance matrix of the estimated values
$Q_k$: covariance matrix of the process noise
$R_k$: covariance matrix of the output variable
$S_k$: residual covariance matrix
I: unit matrix (for each step)

The following initial values can be used for the exemplary case described in FIG. 4.

$P_k$ can be a 4×4 matrix, in which only the main diagonal can be occupied for $P_0$. As initial values, thus values in the main diagonal, values can be selected according to a rough expectation, namely how good the initial values $x_0=0$ are. For example, the values in the main diagonal can be selected as $P_0(1,1)=(10^6)^2$; $P_0(2,2)=(10^6)^2$; $P_0(3,3)=0.1^2$; $P_0(4,4)=0.1^2$ Precise initial values are not important, the order of magnitude is more fundamentally decisive than the correct value.

$Q_k$ and $R_k$ can be assumed to be constant for simplification. $Q_k$ characterizes how fast the states can change independently of the model equations. The main diagonal can be occupied here with: $Q_0(1,1)=0$; $Q_0(2,2)=Q_0(3,3)=(10^{-7})^2$; $Q_0(4,4)=(10^2)^2$ $R_k$ describes the measurement noise and, for example, $(10^4)^2$ can be assumed as the initial value.

According to one aspect, the following results, also with reference to FIG. 4:

$$x_k = [M_y, M_{y,o}, \gamma_A, \gamma_B]^T$$

-continued $$u_k = [\varphi, v_W, n_R, \alpha, n_{DRV}]^T$$

$$z_k = M_n$$

The transfer functions result from the system description shown above, also from the relationships according to FIG. 4.

It is to be noted that if a Luenberger observer is used, no noise is taken into consideration, not for states, input variables, or output variables. It is therefore possible to return the observer deviation via a fixed correction vector. The recursive change of the return amplification matrix $K_k$ and the recursive calculations required for this purpose, which are necessary with the Kalman filter, can be omitted with the Luenberger observer. The fixed correction vector can be calculated beforehand.

System states can also be designated in simplified form and synonymously as states. They also include the states of the observer.

Figure 5:
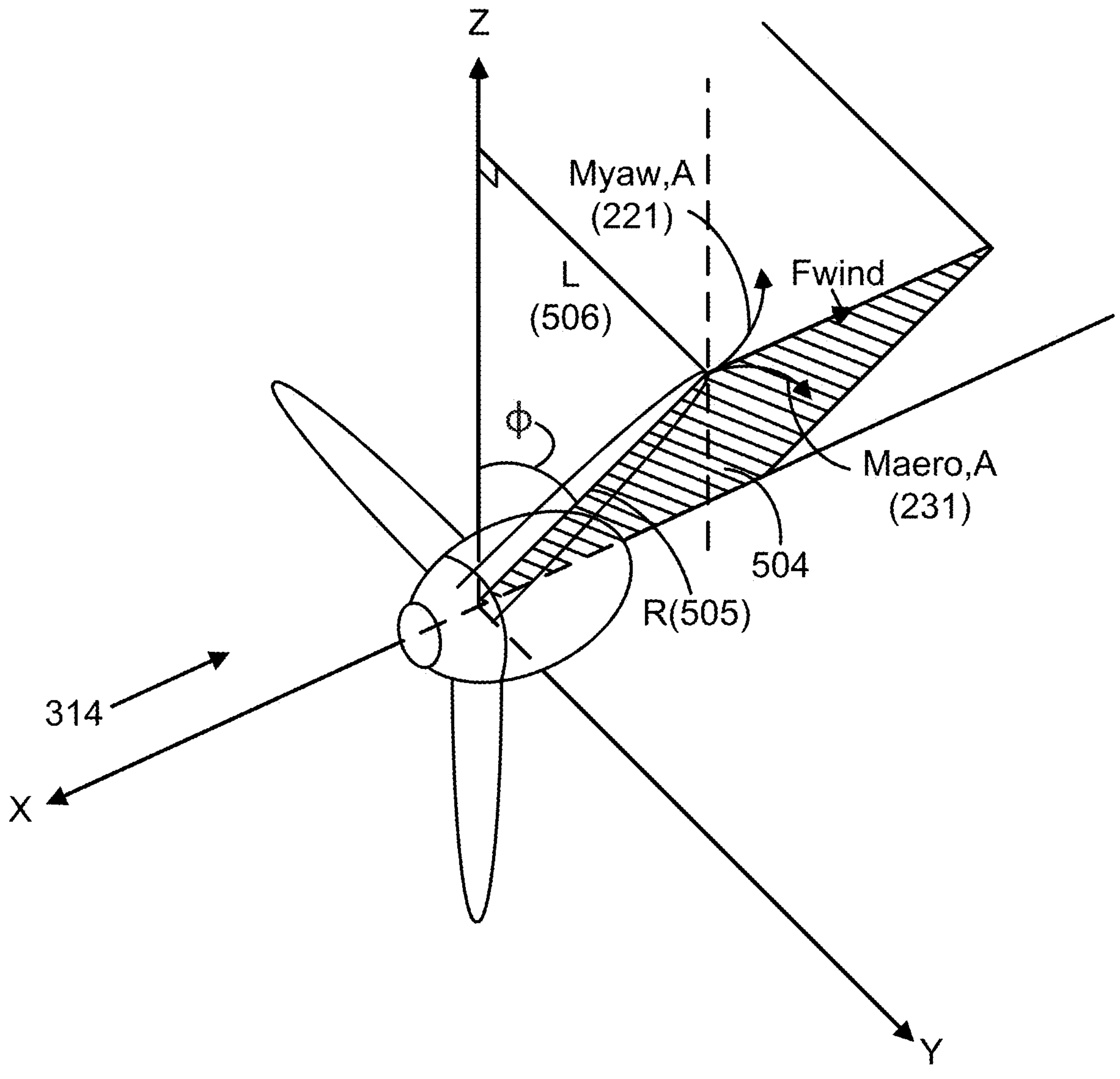
FIG. 5 schematically shows an isometric view of the rotor.

FIG. 5 shows an isometric view of a rotor in a three-dimensional space defined by an X direction, a Y direction, and a Z direction. Wind 314 exerts a force Fwind on a blade of the rotor along the negative X direction. The blade of the rotor is disposed at rotor angle φ relative to the Z direction. The force Fwind acts along the blade root with a lever arm equal to a blade length R 505, which results in an aerodynamic blade torque $M_{aero,A}$ 231, which lies in a plane 504, which is indicated by hatch marks in FIG. 5. As shown in FIG. 5, a component of the aerodynamic blade torque $M_{aero,A}$ 231, i.e., an azimuth torque component $M_{yaw,A}$ 221 is in the gondola rotational direction (z-direction). The azimuth torque component 221 has a lever arm L, which is the shortest distance from the point of application of the force to the axis of rotation, which is indicated by reference number 506. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for detecting at least one blade misalignment of a rotor blade of a rotor of a wind turbine, wherein:

the wind turbine has multiple rotor blades having blade angles, respectively, that are adjustable, the multiple rotor blades including the rotor blade of the rotor of the wind turbine, the blade misalignment represents a blade angle deviation of a detected blade angle of the rotor blade from a reference blade angle, and the wind turbine includes a gondola having the rotor and an azimuth adjustment device for adjusting the gondola in an azimuth alignment having an azimuth angle, wherein the method comprises:

adjusting, by the azimuth adjustment device, the azimuth angle to a predeterminable azimuth setpoint angle in order to adjust the azimuth alignment; and detecting the blade misalignment as a function of an azimuth movement of the gondola, wherein a state observer for detecting the blade misalignment uses as state variables at least:

a gondola azimuth torque;

an azimuth torque offset; and the blade misalignment of each of two rotor blades of the multiple rotor blades.

2. The method according to claim 1, wherein detecting the blade misalignment as a function of the azimuth movement of the gondola includes:

detecting an adjustment activity of the azimuth adjustment device.

3. The method according to claim 2, wherein the adjustment activity is an adjustment activity of at least one azimuth motor of the azimuth adjustment device.

4. The method according to claim 1, comprising:

counteracting, by the azimuth adjustment device, a change of the azimuth alignment of the gondola due to wind action by a regulation of the azimuth angle.

5. The method according to claim 4, wherein:

the azimuth adjustment device does not have a holding brake, or adjustment of the azimuth angle is performed continuously.

6. The method according to claim 1, wherein a state observer is used to detect the blade misalignment.

7. The method according to claim 1, wherein the gondola azimuth torque points in a gondola rotational direction and includes:

a plurality of azimuth torque components, directed in the gondola rotational direction, of aerodynamic blade torques of all of the rotor blades, and the azimuth torque offset, wherein a sum of the azimuth torque components of all rotor blades and the azimuth torque offset forms the gondola azimuth torque.

8. The method according to claim 1, wherein a Kalman filter is used as a state observer for detecting the blade misalignment.

9. The method according to claim 1, wherein an adjustment activity of the azimuth adjustment device is produced by evaluating an azimuth drive torque, such that a drive torque is designated with which the gondola is adjusted in an azimuth orientation.

10. The method according to claim 9, wherein:

the azimuth drive torque is determined as a function of one motor current or multiple motor currents or one motor torque or multiple motor torques of at least one azimuth motor, or the azimuth drive torque is determined as a product of the one motor current, a sum of the multiple motor currents, the one motor torque, or a sum of the multiple motor torques and a proportionality factor.

11. The method according to claim 9, wherein:

the azimuth drive torque is used as an output variable of a state observer, the state observer outputs an estimated azimuth drive torque, or an azimuth drive variable representative of the estimated azimuth drive torque, and a difference between a detected azimuth drive torque and the estimated azimuth drive torque or a difference of variables representative thereof is returned as an observation error for adapting observer states in the state observer.

12. The method according to claim 1, wherein a state observer for detecting the blade misalignment in which for each rotor blade an aerodynamic blade torque $M_{aero}$ is described by a model of the state observer including the equation of:

$$M_{aero} = \frac{1}{3} * \frac{1}{2} * \pi * \rho_{air} * c_s(\lambda, \alpha + Y) * l_{bl}^3 * (v_{Wind} + \omega_{Yaw} * l_{bl} * \sin(\varphi))^2$$

with:

$\rho_{air}$=air density $$\lambda = \frac{\omega_{Rot} * l_{bl}}{v_{Wind}} = \text{speed ratio } (\omega_{Rot} = \text{rotor velocity or rotor speed in rad/s})$$

$l_{bl}$=rotor blade length $\alpha$=blade angle $\gamma$=blade misalignment of the rotor blade $\gamma c_s(\lambda,\alpha)$=aerodynamic properties of the rotor blade $v_{Wind}$=wind velocity $\omega_{Yaw}$=azimuth rotational velocity $\omega_{Yaw}*l_{bl}*\sin(\varphi)$=apparent wind velocity due to an azimuth movement at the rotor blade; with $\varphi$: rotor angle, wherein each blade torque $M_{aero}$ represents a torque acting on the rotor due to the rotor blade in a rotational direction transverse to an axis of rotation of the rotor, wherein each blade torque $M_{aero}$ is transformed using an angle transformation as a function of a rotor angle of the rotor related to the respective blade into an azimuth torque component directed in a gondola rotational direction, a gondola azimuth torque is calculated as a sum of the azimuth torque component and the azimuth torque offset, a gondola acceleration torque is calculated as a function of a change of an azimuth speed and a mass moment of inertia of the gondola, an azimuth drive torque is determined as a function of a difference between the gondola azimuth torque and the gondola acceleration torque, and the azimuth drive torque, or a variable representative thereof, forms an output variable of the model of the state observer.

13. The method according to claim 12, wherein two of the blade misalignments, the azimuth torque offset, and a azimuth torque form system states of the model of the state observer, and a sum of the blade misalignment of all rotor blades is zero and the blade misalignment of one of the rotor blades is calculated from the blade misalignment of remaining rotor blades.

14. The method according to claim 1, wherein a state observer is described by the following equation system and in which three rotor blades A, B, and C are used:

$$M_{aero,A} = f(v_w, n_R, \alpha, \gamma_A);\ M_{aero,B} = f(v_w, n_R, \alpha, \gamma_B);$$

$$M_{aero,C} = f(v_w, n_R, \alpha, \gamma_C);$$

$$M_{yaw,A} = f(M_{aero,A,\varphi});\ M_{yaw,B} = f(M_{aero,B,\varphi});\ M_{yaw,C} = f(M_{aero,C,\varphi})$$

$$\gamma_c = -\gamma_A - \gamma_B$$

$$M_{yaw,Nac} = M_{yaw,A} + M_{yaw,B} + M_{yaw,C} + M_{yaw,off}$$

-continued $$M_{acc} = i_{ge} \cdot i \frac{dn_{DRV}}{dt} \cdot J_{Nac}$$

$$M_{DRV} = \frac{1}{i_g} \cdot (M_{yaw,Nac} - M_{acc})$$

with $M_{aero,A}$, $M_{aero,B}$ and $M_{aero,C}$: aerodynamic blade torque $M_{aero}$ of the rotor blade A, B, or C, respectively;

$v_w$: wind velocity; $n_R$: rotor speed; $\alpha$: blade angle; $\varphi$: rotor angle $M_{yaw,A}$, $M_{yaw,B}$, and $M_{yaw,C}$: azimuth torque component of the rotor blade A, B, or C, respectively;

$\gamma_A$, $\gamma_B$ and $\gamma_C$: blade misalignment of the rotor blade A, B, or C, respectively;

$M_{yaw,off}$: azimuth torque offset;

$M_{yaw,Nac}$: gondola azimuth torque;

$M_{acc}$: gondola acceleration torque;

$$M_{acc} = i_{ge} \cdot i \frac{dn_{DRV}}{dt} \cdot J_{Nac};$$

$i_g$: transmission ratio between azimuth motor and gondola;

$n_{DRV}$: speed of azimuth motor;

$J_{Nac}$: mass moment of inertia of gondola $M_{DRV}$: motor torque of azimuth motor.

15. A method for correcting at least one blade misalignment of a rotor blade of a rotor of a wind turbine having multiple rotor blades that each have an adjustable blade angle, the multiple rotor blades including the rotor blade of the rotor of the wind turbine, wherein the blade misalignment represents a blade angle deviation of a detected blade angle of the rotor blade from a reference blade angle, and the wind turbine includes a gondola having the rotor and an azimuth adjustment device for adjusting the gondola in an azimuth alignment having an azimuth angle, and wherein the method comprises:

adjusting, by the azimuth adjustment device, the azimuth angle to a predeterminable azimuth setpoint angle in order to adjust the azimuth alignment;

detecting the blade misalignment as a function of an azimuth movement of the gondola; and for each rotor blade, determining a correction angle as a function of the detected blade misalignment; and correcting the detected blade angle using the correction angle, or comparing the detected blade misalignment to a predeterminable deviation limiting value and generating an error or warning message if an absolute value of the detected blade misalignment is greater than the deviation limiting value, wherein a state observer for detecting the blade misalignment uses as state variables at least:

a gondola azimuth torque;

an azimuth torque offset; and the blade misalignment of each of two rotor blades of the multiple rotor blades.

16. The method according to claim 15, wherein the correction angle corresponds to the detected blade misalignment, or the correction angle is adjusted to correspond to the detected blade misalignment with a delay function having a time constant of at least one hour.

* * * * *